United States Patent
Boraten et al.

(10) Patent No.: US 12,265,470 B1
(45) Date of Patent: Apr. 1, 2025

(54) BYPASSING CACHE DIRECTORY LOOKUPS FOR PROCESSING-IN-MEMORY INSTRUCTIONS

(71) Applicant: Advanced Micro Devices, Inc., Santa Clara, CA (US)

(72) Inventors: Travis Henry Boraten, Austin, TX (US); Jagadish B. Kotra, Austin, TX (US); David Andrew Werner, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 29 days.

(21) Appl. No.: 18/374,969

(22) Filed: Sep. 29, 2023

(51) Int. Cl.
*G06F 12/0815* (2016.01)

(52) U.S. Cl.
CPC .... *G06F 12/0815* (2013.01); *G06F 2212/621* (2013.01)

(58) Field of Classification Search
None
See application file for complete search history.

(56) References Cited

U.S. PATENT DOCUMENTS

| | | |
|---|---|---|
| 6,553,465 B1 | 4/2003 | Takusagawa |
| 6,944,746 B2 | 9/2005 | So |
| 7,047,393 B2 | 5/2006 | Paver |
| 8,359,462 B1 | 1/2013 | Khan et al. |
| 9,575,815 B1 | 2/2017 | Guthrie et al. |
| 10,061,588 B2 | 8/2018 | Gschwind et al. |
| 11,487,447 B2 | 11/2022 | Islam et al. |
| 11,594,274 B2 | 2/2023 | Murphy et al. |
| 11,625,249 B2 | 4/2023 | Kotra et al. |
| 11,625,251 B1 * | 4/2023 | Agrawal ............. G06F 9/30189 712/7 |
| 11,663,008 B2 | 5/2023 | Lee et al. |
| 11,797,201 B2 | 10/2023 | Islam et al. |
| 11,868,777 B2 | 1/2024 | Kalamatianos et al. |

(Continued)

FOREIGN PATENT DOCUMENTS

WO  WO-2022046371  3/2022

OTHER PUBLICATIONS

"X86 Instruction Set Reference: CLFLUSH", Retrieved Jan. 24, 2024. Retrieved from the Internet <https://c9x.me/x86/html/file_module_x86_id_30.html>, 2 pages.

(Continued)

*Primary Examiner* — Edward J Dudek, Jr.
*Assistant Examiner* — Ralph A Verderamo, III
(74) *Attorney, Agent, or Firm* — FIG. 1 Patents

(57) ABSTRACT

Selectively bypassing cache directory lookups for processing-in-memory instructions is described. In one example, a system maintains information describing a status—clean or dirty—of a memory address, where a dirty status indicates that the memory address is modified in a cache and thus different than the memory address as represented in system memory. A processing-in-memory request involving the memory address is assigned a cache directory bypass bit based on the status of the memory address. The cache directory bypass bit for a processing-in-memory request controls whether a cache directory lookup is performed after the processing-in-memory request is issued by a processor core and before the processing-in-memory request is executed by a processing-in-memory component.

20 Claims, 5 Drawing Sheets

(56) References Cited

U.S. PATENT DOCUMENTS

| | | | |
|---|---|---|---|
| 12,073,251 | B2 | 8/2024 | Challapalle et al. |
| 12,153,926 | B2 | 11/2024 | Kalamatianos et al. |
| 2008/0046692 | A1 | 2/2008 | Michalak et al. |
| 2008/0244185 | A1 | 10/2008 | O'Krafka et al. |
| 2011/0242113 | A1 | 10/2011 | Keall et al. |
| 2012/0069664 | A1 | 3/2012 | Kim et al. |
| 2012/0246395 | A1 | 9/2012 | Cho et al. |
| 2013/0086367 | A1 | 4/2013 | Gschwind et al. |
| 2014/0281405 | A1 | 9/2014 | Streett et al. |
| 2016/0092238 | A1 | 3/2016 | Codrescu et al. |
| 2016/0155491 | A1 | 6/2016 | Roberts et al. |
| 2017/0060588 | A1 | 3/2017 | Choi |
| 2017/0123987 | A1 | 5/2017 | Cheng et al. |
| 2017/0213312 | A1 | 7/2017 | Woo et al. |
| 2017/0262369 | A1 | 9/2017 | Murphy |
| 2017/0344480 | A1 | 11/2017 | Beard et al. |
| 2018/0089081 | A1 | 3/2018 | Ramalingam |
| 2018/0188961 | A1 | 7/2018 | Venkatesh et al. |
| 2018/0336035 | A1* | 11/2018 | Choi .................. G06F 9/35 |
| 2019/0089081 | A1 | 3/2019 | Zhang |
| 2020/0192757 | A1 | 6/2020 | Qin et al. |
| 2020/0218540 | A1 | 7/2020 | Kesiraju et al. |
| 2021/0271680 | A1 | 9/2021 | Lee et al. |
| 2022/0076717 | A1 | 3/2022 | Mathew et al. |
| 2022/0188117 | A1 | 6/2022 | Kalamatianos et al. |
| 2022/0188233 | A1* | 6/2022 | Kalamatianos ..... G06F 12/0828 |
| 2022/0206817 | A1 | 6/2022 | Kotra et al. |
| 2022/0206855 | A1 | 6/2022 | Challapalle et al. |
| 2022/0276795 | A1 | 9/2022 | Islam et al. |
| 2023/0244442 | A1 | 8/2023 | Lee et al. |
| 2023/0244492 | A1 | 8/2023 | Kotra et al. |
| 2024/0126552 | A1 | 4/2024 | Kalamatianos et al. |

OTHER PUBLICATIONS

U.S. Appl. No. 17/136,767, filed Apr. 30, 2024, "Notice of Allowance", U.S. Appl. No. 17/136,767, filed Apr. 30, 2024, 18 pages.
U.S. Appl. No. 17/473,242, filed Mar. 7, 2024, "Non-Final Office Action", U.S. Appl. No. 17/473,242, filed Mar. 7, 2024, 16 pages.
Nai, Lifeng, et al., "GraphPIM: Enabling Instruction-Level PIM Offloading in Graph Computing Frameworks", 2017 IEEE International Symposium on High Performance Computer Architecture (HPCA), Feb. 2017, 12 pages.
Xu, Sheng, et al., "TUPIM: A Transparent and Universal Processing-in-Memory Architecture for Unmodified Binaries", GLSVLSI '20: Proceedings of the 2020 on Great Lakes Symposium on VLSI, Sep. 2020, 6 pages.
U.S. Appl. No. 18/393,657, "Notice of Allowance", U.S. Appl. No. 18/393,657, filed Jul. 31, 2024, 9 pages.
"ARM946E-S Technical Reference Manual r1p1", Arm Developer [retrieved May 17, 2023]. Retrieved from the Internet <https://developer.arm.com/documentation/ddi0201/d/programmer-s-model/cp15-register-map- summary/register-7--cache-operations-register>., 6 Pages.
"Google Project Zero", GitHub Inc., Uplaoded by Projects by Google Project Zero [retrieved Sep. 15, 2022]. Retrieved from the Internet <https://github.com/googleprojectzero>., 3 Pages.
"HPCA 2021", The 27th IEEE International Symposium on High-Performance Computer Architecture (HPCA-27), Seoul, South Korea [retrieved Sep. 15, 2022]. Retrieved from the Internet <https://hpca-conf.org/2021/keynotes/>., Mar. 2021, 3 Pages.
U.S. Appl. No. 17/123,270, , "Final Office Action", U.S. Appl. No. 17/123,270, filed Nov. 23, 2021, 15 pages.
U.S. Appl. No. 17/123,270, , "Non-Final Office Action", U.S. Appl. No. 17/123,270, filed Aug. 4, 2021, 14 pages.
U.S. Appl. No. 17/123,270, , "Notice of Allowance", U.S. Appl. No. 17/123,270, filed Sep. 7, 2023, 7 pages.
U.S. Appl. No. 17/123,270, , "Notice of Allowance", U.S. Appl. No. 17/123,270, filed Nov. 10, 2022, 7 pages.
U.S. Appl. No. 17/137,140, , "Final Office Action", U.S. Appl. No. 17/137,140, filed Aug. 15, 2022, 8 pages.
U.S. Appl. No. 17/137,140, , "Non-Final Office Action", U.S. Appl. No. 17/137,140, filed Mar. 9, 2022, 8 pages.
U.S. Appl. No. 17/137,140, , "Notice of Allowance", U.S. Appl. No. 17/137,140, filed Dec. 8, 2022, 8 pages.
U.S. Appl. No. 17/745,278, , "Non-Final Office Action", U.S. Appl. No. 17/745,278, filed Feb. 23, 2023, 8 pages.
U.S. Appl. No. 17/745,278, , "Notice of Allowance", U.S. Appl. No. 17/745,278, filed Jun. 14, 2023, 5 pages.
Adhinarayanan, Vignesh et al., "Pursuant to MPEP § 2001.06(b) the applicant brings the following co- pending application to the Examiner's attention:", U.S. Appl. No. 17/855,157, filed Jun. 30, 2022, 37 pages.
Agrawal, Varun et al., "Pursuant to MPEP § 2001.06(b) the applicant brings the following co-pending application to the Examiner's attention:", U.S. Appl. No. 17/561,112, filed Dec. 23, 2021, 25 pages.
Alsop, Jonathan et al., "Pursuant to MPEP § 2001.06(b) the applicant brings the following co-pending application to the Examiner's attention:", U.S. Appl. No. 17/853,613, filed Jun. 29, 2022, 28 pages.
Aweke, Zelalem B. et al., "ANVIL: Software-Based Protection Against Next-Generation Rowhammer Attacks", ACM SIGPLAN Notices, vol. 51, No. 4 [retrieved Sep. 15, 2022]. Retrieved from the Internet <http://www.seclab.cs.stonybrook.edu/seclab/pubs/ANVIL.pdf>., Mar. 25, 2016, 13 Pages.
Boraten, Travis H. et al., "Pursuant to MPEP § 2001.06(b) the applicant brings the following co-pending application to the Examiner's attention:", U.S. Appl. No. 18/192,925, filed Mar. 30, 2023, 48 pages.
Boraten, Travis H. et al., "Pursuant to MPEP § 2001.06(b) the applicant brings the following co-pending application to the Examiner's attention:", U.S. Appl. No. 18/374,951, filed Sep. 29, 2023, 50 pages.
Boraten, Travis H. , "Pursuant to MPEP § 2001.06(b) the applicant brings the following co-pending application to the Examiner's attention:", U.S. Appl. No. 18/146,904, filed Dec. 27, 2022, 53 pages.
Boyer, Michael W. et al., "Pursuant to MPEP § 2001.06(b) the applicant brings the following co-pending application to the Examiner's attention:", U.S. Appl. No. 17/719,225, filed Apr. 12, 2022, 32 pages.
Brasser, Ferdinand et al., "CAn't touch this: software-only mitigation against rowhammer attacks targeting kernel memory", Proceedings of the 26th USENIX Conference on Security Symposium [retrieved Sep. 15, 2022]. Retrieved from the Internet <https://www.usenix.org/system/files/conference/usenixsecurity17/sec17-brasser.pdf>., Aug. 16, 2017, 15 Pages.
Cantin, J.F. et al., "Coarse-Grain Coherence Tracking: RegionScout and Region Coherence Arrays", IEEE Micro, vol. 26, No. 1 [retrieved Oct. 16, 2022]. Retrieved from the Internet <https://pharm.ece.wisc.edu/papers/ieeemicro2005.pdf>., Oct. 11, 2022, 10 Pages.
Gulur, Nagendra Dwarakanath et al., "Multiple sub-row buffers in DRAM: unlocking performance and energy improvement opportunities", Proceedings of the 26th ACM international conference on Supercomputing [retrieved Sep. 15, 2022]. Retrieved from the Internet <https://csrl.cse.unt.edu/sites/default/files/publications/p257-gulur.pdf>., Jun. 25, 2012, 10 Pages.
Hassan, Hasan et al., "Uncovering In-DRAM RowHammer Protection Mechanisms:A New Methodology, Custom RowHammer Patterns, and Implications", 54th Annual IEEE/ACM International Symposium on Microarchitecture [retrieved Sep. 15, 2022]. Retrieved from the Internet <https://arxiv.org/pdf/2110.10603.pdf>., Oct. 17, 2021, 16 Pages.
Jin, Xingyu et al., "Project Zero", News and updates from the Project Zero team at Google [retrieved Sep. 15, 2022]. Retrieved from the Internet <https://googleprojectzero.blogspot.com/>., Aug. 10, 2022, 15 Pages.
Kim, Jeremie S. et al., "Revisiting RowHammer: An Experimental Analysis of Modern DRAM Devices and Mitigation Techniques",

(56) References Cited

OTHER PUBLICATIONS

Cornell University arXiv, arXiv.org [retrieved Sep. 15, 2022]. Retrieved from the Internet <https://arxiv.org/pdf/2005.13121.pdf>., May 29, 2020, 15 Pages.

Kim, Nam Sung, "A Journey to a Commercial-Grade Function-In-Memory (FIM) Chip Development", HPCA-2021, Keynote [retrieved May 10, 2023]. Retrieved from the Internet <https://hpca-conf.org/2021/keynotes/>., Mar. 3, 2021, 3 Pages.

Kim, Nam Sung, "A Journey to a Commercial-Grade Processing-In-Memory (PIM) Chip Development", The 27th IEEE International Symposium on High-Performance Computer Architecture (HPCA-27), Seoul, South Korea [retrieved May 24, 2023]. Retrieved from the Internet <https://hpca-conf.org/2021/keynotes/>., Mar. 3, 2021, 3 Pages.

Kim, Yoongu et al., "A case for exploiting subarray-level parallelism (SALP) in DRAM", 2012 39th Annual International Symposium on Computer Architecture (ISCA) [retrieved Sep. 15, 2022]. Retrieved from the Internet <https://www.pdl.cmu.edu/PDL-FTP/NVM/ISCA39_SALP.pdf>., Sep. 2012, 12 Pages.

Kim, Yoongu et al., "Flipping bits in memory without accessing them: an experimental study of DRAM disturbance errors", ACM SIGARCH Computer Architecture News, vol. 42, No. 3 [retrieved Sep. 15, 2022]. Retrieved from the Internet <https://people.cs.pitt.edu/~znati/Courses/cs2001/2001pprs/row-hammering.pdf>., Jun. 14, 2014, 12 Pages.

Konoth, Radhesh Krishnan, "ZebRAM: Comprehensive and Compatible Software Protection Against Rowhammer Attacks", 13th USENIX Symposium on Operating Systems Design and Implementation [retrieved Sep. 15, 2022]. Retrieved from the Internet <https://www.usenix.net/system/files/osdi18-konoth.pdf>., Oct. 2018, 15 Pages.

Lamport, Leslie, "Sharing Memory Between Processes", Part II. Interprocess Communication [retrieved May 24, 2023]. Retrieved from the Internet <https://techpubs.jurassic.nl/manuals/0630/developer/T_IRIX_Prog/sgi_html/ch03.html#id5198232>., Jun. 1986, 19 Pages.

Lee, Chulki et al., "DRAM Row hammer micro-benchmark", GitHub, Inc. Uploaded by rowhammer-test [retrieved Sep. 15, 2022]. Retrieved from the Internet <https://github.com/google/rowhammer-test>., 3 Pages.

Lee, Eojin et al., "TWiCe: preventing row-hammering by exploiting time window counters", Proceedings of the 46th International Symposium on Computer Architecture [retrieved Sep. 15, 2022]. Retrieved from the Internet <https://cpb-us-w2.wpmucdn.com/sites.coecis.cornell.edu/dist/7/89/files/2019/06/isca19-334.pdf>., Jun. 22, 2019, 12 Pages.

Orosa, Lois et al., "A Deeper Look into RowHammer's Sensitivities: Experimental Analysis of Real DRAM Chips and Implications on Future Attacks and Defenses", Cornell University arXiv, arXiv.org [retrieved Sep. 15, 2022]. Retrieved from the Internet <https://arxiv.org/pdf/2110.10291.pdf>., Oct. 19, 2021, 17 Pages.

Qureshi, Moinuddin et al., "Hydra: enabling low-overhead mitigation of row-hammer at ultra-low thresholds via hybrid tracking", Proceedings of the 49th Annual International Symposium on Computer Architecture [retrieved Sep. 15, 2022]. Retrieved from the Internet <https://memlab.ece.gatech.edu/papers/ISCA_2022_1.pdf>., Jun. 11, 2022, 12 Pages.

Saileshwar, Gururaj, "Randomized row-swap: mitigating Row Hammer by breaking spatial correlation between aggressor and victim rows", Proceedings of the 27th ACM International Conference on Architectural Support for Programming Languages and Operating Systems [retrieved Sep. 15, 2022]. Retrieved from the Internet <https://gururaj-s.github.io/assets/pdf/ASPLOS22_Saileshwar.pdf>., Feb. 28, 2022, 14 Pages.

Werner, David A. et al., "Pursuant to MPEP § 2001.06(b) the applicant brings the following co-pending application to the Examiner's attention:", U.S. Appl. No. 18/375,018, filed Sep. 29, 2023, 54 pages.

Yağlikçi, Giray A. et al., "BlockHammer: Preventing RowHammer at Low Cost by Blacklisting Rapidly-Accessed DRAM Rows", Cornell University arXiv, arXiv.org [retrieved Sep. 15, 2022]. Retrieved from the Internet <https://arxiv.org/pdf/2102.05981.pdf>., Feb. 11, 2021, 15 Pages.

U.S. Appl. No. 18/298,723, "Non-Final Office Action", U.S. Appl. No. 18/298,723, filed Jun. 20, 2024, 9 pages.

Ahn, Junwhan, et al., "PIM-enabled instructions: a low-overhead, locality-aware processing-in-memory architecture", ACM SIGARCH Computer Architecture News, vol. 43, No. 3S [retrieved Jan. 12, 2024]. Retrieved from the Internet <https://doi.org/10.1145/2872887.2750385>, Jun. 13, 2015, 13 pages.

Byoung-Hak, Kim, et al., "Exploration of a PIM Design Configuration for Energy-Efficient Task Offloading", 2019 IEEE International Symposium on Circuits and Systems (ISCAS) [retrieved Jan. 12, 2024]. Retrieved from the Internet <https://doi.org/10.1109/ISCAS.2019.8702339>, May 2019, 4 pages.

Ghose, S, et al., "Processing-in-memory: A workload-driven perspective", IBM Journal of Research and Development, vol. 63, No. 6 [retrieved Jan. 12, 2024]. Retrieved from the Internet <https://doi.org/10.1147/JRD.2019.2934048> 1 of 2, Aug. 8, 2019, 19 pages.

Ghose, S, et al., "Processing-in-memory: A workload-driven perspective", IBM Journal of Research and Development, vol. 63, No. 6 [retrieved Jan. 12, 2024]. Retrieved from the Internet <https://doi.org/10.1147/JRD.2019.2934048> 2 of 2, Aug. 8, 2019, 19 pages.

Pattnaik, Ashutosh, et al., "Scheduling techniques for GPU architectures with processing-in-memory capabilities", PACT '16: Proceedings of the 2016 International Conference on Parallel Architectures and Compilation [retrieved Oct. 16, 2022]. Retrieved from the Internet <https://research.ece.cmu.edu/safari/pubs/scheduling-for-GPU-processing-in-memory_pact16.pdf>., Sep. 11, 2016, 14 Pages.

Lee, Won Jun, et al., "Design of Processing-"Inside"-Memory Optimized for DRAM Behaviors", IEEE Access, vol. 7 [retrieved Jan. 12, 2024]. Retrieved from the Internet <https://doi.org/10.1109/ACCESS.2019.2924240>, Jun. 21, 2019, 16 pages.

Werner, David Andrew, et al., "Pursuant to MPEP § 2001.06(b) the applicant brings the following co-pending application to the Examiner's attention:", U.S. Appl. No. 18/621,319, filed Mar. 29, 2024, 61 pages.

U.S. Appl. No. 17/473,242, "Final Office Action", U.S. Appl. No. 17/473,242, Oct. 22, 2024, 13 pages.

U.S. Appl. No. 18/298,723, "Final Office Action", U.S. Appl. No. 18/298,723, Oct. 11, 2024, 7 pages.

U.S. Appl. No. 18/375,018, "Non-Final Office Action", U.S. Appl. No. 18/375,018, Oct. 9, 2024, 11 pages.

\* cited by examiner

BYPASSING CACHE DIRECTORY LOOKUPS FOR PROCESSING-IN-MEMORY INSTRUCTIONS

BACKGROUND

Processing-in-memory (PIM) architectures move processing of memory-intensive computations to memory. This contrasts with standard computer architectures which communicate data back and forth between a memory and a remote processing unit. In terms of data communication pathways, remote processing units of conventional computer architectures are further away from memory than processing-in-memory components.

As a result, these conventional computer architectures suffer from increased data transfer latency, which can decrease overall computer performance and increase energy cost. Further, due to the proximity to memory, PIM architectures can also provision higher memory bandwidth and reduced memory access energy relative to conventional computer architectures particularly when the volume of data transferred between the memory and the remote processing unit is large. Thus, processing-in-memory architectures enable increased energy efficiency (e.g., performance per Joule) while reducing data transfer latency as compared to conventional computer architectures that implement remote processing hardware.

DETAILED DESCRIPTION

Overview

Figure 1:
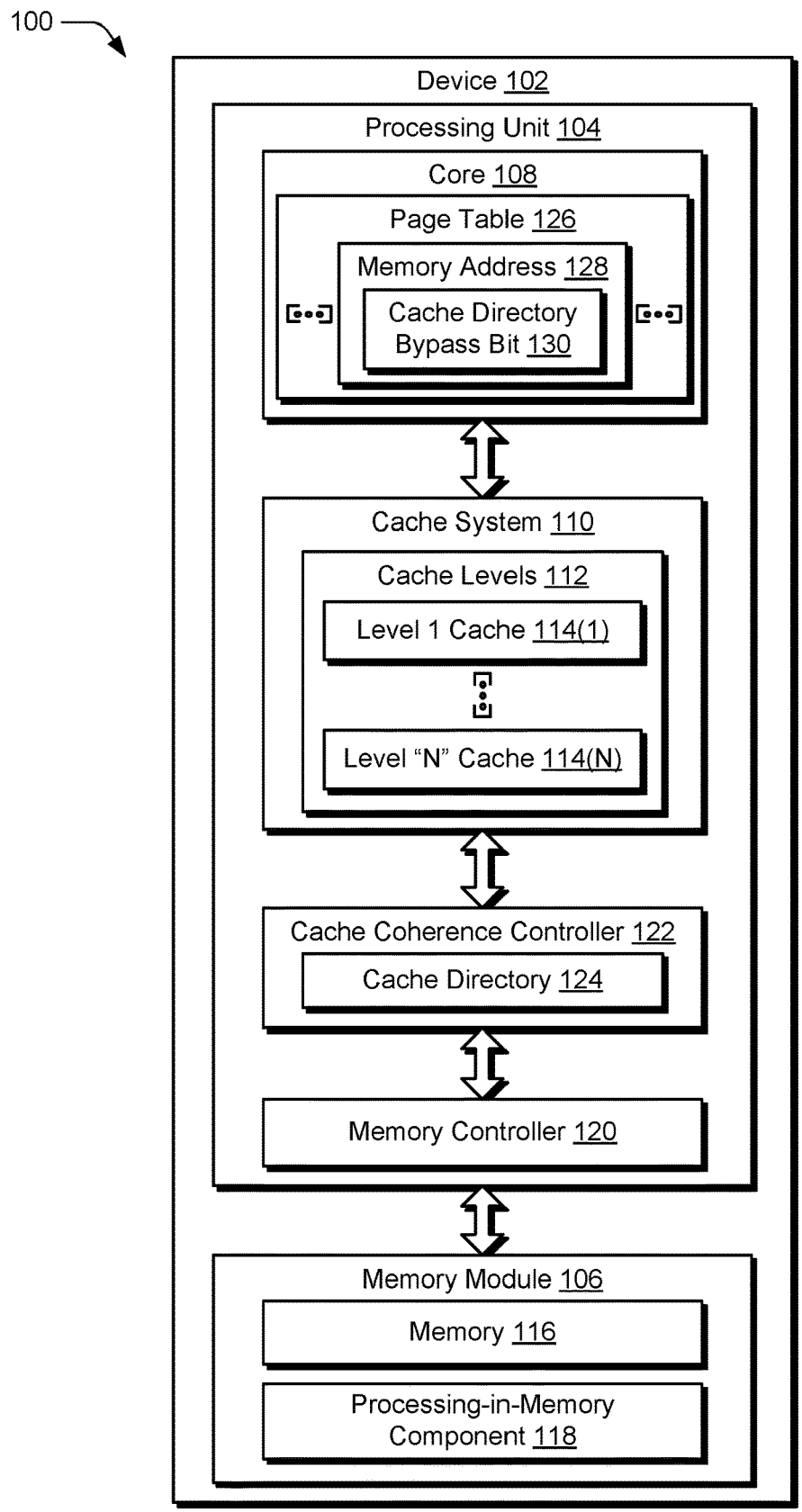
FIG. 1 is a block diagram of a non-limiting example system having a device that implements a processing unit and memory module to implement cache directory lookup bypass techniques for processing-in-memory instructions.

Processing-in-memory (PIM) incorporates processing capability within memory modules so that tasks are processed directly within the memory modules. Processing-in-memory (PIM) techniques also refer to incorporation of processing capability near memory modules so that tasks are also processed without costly round-trip transmission to host processors or other distant computing units. To do so, processing-in-memory leverages techniques are configurable to trigger local computations at multiple memory modules in parallel without involving data movement across a memory module interface, which improves performance, especially for data-intensive workloads such as machine learning.

One of the technical problems of offloading computations to memory (e.g., using PIM techniques) is to ensure that data that is a subject of a memory request is valid in memory (e.g., for use as part of a processing-in-memory operation). A device, for instance, is configurable to include a plurality of cores and associated cache systems as well as memory included in the memory modules (e.g., as dynamic random-access memory (DRAM)).

In order to ensure data validity such that a processing-in-memory operation is performed using "valid" data, a cache coherence controller implements cache directory lookups to query a cache directory. The cache directory maintains cache directory entries that reference memory addresses maintained in respective cache levels of the cache system (e.g., a location of a respective memory address and a status of the respective memory address). The cache directory entries also reference whether data at those memory addresses is "clean" or "dirty" as being unchanged or changed with respect to versions of that data maintained in memory. In other words, the cache directory lookup indicates whether data maintained in the memory has a corresponding version in the cache system and whether that version is changed in the cache system with respect to the memory.

If the data in the memory is not valid in memory for execution of a processing-in-memory instruction (meaning that the data in the cache system is more recent) the cache coherence controller transmits a cache request to the cache system. This causes the cache system to transmit a cache response to the memory such that the data in the memory is subsequently valid for computation by the processing-in-memory component. This is performable, for instance, by leveraging the cache request to cause the cache system to write the data back to memory (e.g., "flush" the data) and/or invalidate the data in the cache system. The cache coherence controller then releases the memory request to the processing-in-memory component for processing (e.g., via a memory controller for performance as part of a processing-in-memory operation).

For example, if a cache system stores "dirty" data for a memory address associated with a memory request, the dirty data is first flushed from the cache system to memory to ensure that the memory request and corresponding processing-in-memory operation is performed using a most recent version of the data. If the cache system stores clean data for the memory request, the clean data is invalidated at the cache system (e.g., through another cache request). This is performed by the cache coherence controller to ensure that subsequent memory requests retrieve the data from memory instead of using stale data from the cache system. This "round trip" in each instance involving the cache coherence controller, the cache system, and memory causes memory requests in conventional systems to stall at the cache directory while waiting for the cached data to be evicted and written back as part of a cache response to memory or invalidated. This results in computational inefficiencies, increased power consumption, and delays.

To overcome these computational inefficiencies facing conventional systems, techniques for selectively bypassing cache directory lookups for processing-in-memory instructions are described. The described techniques involve maintaining information describing a current state of a memory address (e.g., whether data elements associated with the memory address are "clean" or "dirty"). The current state of the memory address is used to define a value of a designated bit included in a processing-in-memory request, described herein as a "cache directory bypass bit," which controls whether a cache directory lookup is performed for the processing-in-memory request (e.g., after the processing-in-memory request is issued by a processor core and before scheduling the processing-in-memory request for execution by a processing-in-memory component).

For instance, when generating a processing-in-memory request, the processor core consults a page table, or other data structure that maintains information describing current states of memory addresses, to determine whether one or more memory addresses associated with the processing-in-memory request are clean or dirty. In response to identifying that one or more memory addresses associated with the processing-in-memory request are clean, the processing-in-memory request is generated to include a cache directory bypass bit having a value (e.g., one) that bypasses performance of a cache directory lookup between issuance and execution of the processing-in-memory request. Alternatively, in response to identifying that one or more memory addresses associated with the processing-in-memory request are dirty, the processing-in-memory request is generated to include a cache directory bypass bit having a different value (e.g., zero) that triggers performance of a cache directory lookup before the processing-in-memory request is executed.

In implementations, an indication of whether a memory address is clean or dirty is defined at memory allocation time for a given computational task, such as defined via a memory allocation function for the given computational task. As a specific example, if at memory allocation time a memory address is written to a cache system (e.g., as part of predictive prefetching for a computational task), data describing that the memory address is dirty is maintained at a system component that dispatches PIM requests (e.g., a processor core). Thus, a subsequent generation of a PIM request involving the dirty memory address is assigned a cache directory bypass bit value of zero to trigger performance of a cache directory lookup—and thus invalidation or flushing of the dirty memory address—before the PIM request is scheduled for execution at a processing-in-memory component.

As another example, if at memory allocation time a memory address is marked as read-only (e.g., via one or more hints in a translation lookaside buffer), the system component that dispatches PIM requests is informed that the memory address will remain clean (e.g., due to the read-only status preventing modifications to data element(s) stored at the memory address). Thus, a subsequent generation of a PIM request involving the clean memory address is assigned a cache directory bypass bit value of one to bypass performance of a cache directory lookup before the PIM request is scheduled for execution at a processing-in-memory component. In this manner, bypassing the cache directory lookup avoids spending unnecessary computational cycles and resources on verifying that the memory address is clean and thus improves performance relative to conventional systems.

The system component that maintains the page table, or other data structure that maintains information describing current states of memory addresses, is configured to update the page table to indicate memory address state changes. For instance, in response to detecting that data elements associated with a memory address are flushed or invalidated from a cache system, the page table is updated to note that the memory address is clean. Conversely, when data elements associated with a memory address are written to the cache system, the page table is updated to note that the memory address is dirty.

Although described herein in the context of being a single bit (e.g., a single cache directory bypass bit) to indicate whether an entire memory address is clean or dirty, in some implementations the cache directory bypass bit is configured as a cache directory bypass vector with multiple bits that each indicate whether a corresponding portion of a memory address is clean or dirty. For instance, in a scenario where a memory address includes multiple cache lines, a cache directory bypass vector includes a bit for each of the multiple cache lines and thus identifies with additional granularity whether individual portions of a memory address are clean or dirty.

In some implementations, such as when a memory address represents a shared memory segment that is accessible by different system entities with different permissions (e.g., a memory segment that is read-only for one process and modifiable by another process), the memory address is disabled for cache directory bypass, such that a processing-in-memory request involving the memory address triggers a cache directory lookup. In this manner, the described techniques avoid inadvertently bypassing a cache directory lookup in scenarios where different access permissions for a memory address result in bypassing a cache directory lookup to invalidate or flush data that is dirty (e.g., modified at a cache system).

Although described in the context of being maintained at a page table of a processor, information describing whether various portions of memory are clean or dirty can be maintained at various system locations in accordance with the techniques described herein. For instance, in some implementations memory region tags are implemented using a hardware data structure that stores definitions for each memory address (e.g., clean or dirty) or portion thereof. In some implementations maintaining information describing whether various portions of memory are clean or dirty apart from a page table provides increased flexibility by allowing for arbitrary memory region sizes (e.g., relative to page table page-size constraints).

Thus, the techniques described herein avoid computational delays and energy consumption requirements of conventional systems that do not permit intelligent cache directory bypassing for processing-in-memory requests that involve clean memory addresses. Consequently, the cache directory lookup bypass techniques described herein ensure that data elements involved in processing-in-memory operations are "valid" without encountering the lag and delay involved with the "round trip" of conventional techniques that perform cache directory lookups and invalidations/flushes to ensure data validity. In this way, the techniques described herein improve operational efficiency, reduce latency, and reduce power consumption. Further discussion of these and other examples is included in the following sections and shown in corresponding figures.

In some aspects, the techniques described herein relate to a system including a processing-in-memory component, a cache system, a cache coherence controller, and a processor core configured to generate a processing-in-memory request with an indication that a memory address associated with the processing-in-memory request is clean or dirty, and responsive to the indication being dirty, cause the cache coherence controller to perform a cache directory lookup for the memory address, or responsive to the indication being clean, cause the processing-in-memory component to execute the processing-in-memory request.

In some aspects, the techniques described herein relate to a system, wherein the processor core is configured to maintain information describing whether one or more data elements included in the memory address are stored in the cache system.

In some aspects, the techniques described herein relate to a system, wherein the processor core generates the processing-in-memory request with the indication that the memory address is dirty in response to the one or more data elements included in the memory address being stored in the cache system.

In some aspects, the techniques described herein relate to a system, wherein the processor core generates the processing-in-memory request with the indication that the memory address is clean in response to the one or more data elements included in the memory address not being stored in the cache system.

In some aspects, the techniques described herein relate to a system, wherein the processor core updates the information describing whether the one or more data elements included in the memory address are stored in the cache system in response to detecting a flush of the one or more data elements from the cache system.

In some aspects, the techniques described herein relate to a system, wherein the processor core updates the information describing whether the one or more data elements included in the memory address are stored in the cache system in response to detecting a write of the one or more data elements to the cache system.

In some aspects, the techniques described herein relate to a system, wherein in response to the indication being dirty, the processor core is further configured to cause the cache coherence controller to flush the memory address from the cache system and transmit the processing-in-memory request to the processing-in-memory component after flushing the memory address from the cache system.

In some aspects, the techniques described herein relate to a system, wherein the indication is a bit that is assigned a first value in response to the memory address being clean and assigned a second value in response to the memory address being dirty.

In some aspects, the techniques described herein relate to a system, wherein the indication is a vector including multiple bits, wherein each of the multiple bits corresponds to one or more data elements included in the memory address and is assigned a first value in response to the corresponding one or more data elements being clean and assigned a second value in response to the corresponding one or more data elements being dirty.

In some aspects, the techniques described herein relate to a system, wherein the processor core is configured to ensure that a prior processing-in-memory request has been executed by the processing-in-memory component before causing the processing-in-memory component to execute the processing-in-memory request.

In some aspects, the techniques described herein relate to a system, wherein responsive to the indication being clean, the processor core causes the processing-in-memory component to execute the processing-in-memory request without performance of the cache directory lookup.

In some aspects, the techniques described herein relate to a device including a processor core configured to generate a processing-in-memory request with an indication that a memory address associated with the processing-in-memory request is clean or dirty, and responsive to the indication being dirty, cause performance of a cache directory lookup for the memory address before the processing-in-memory request is executed, or responsive to the indication being clean, cause a processing-in-memory component to execute the processing-in-memory request.

In some aspects, the techniques described herein relate to a device, wherein the processor core is configured to cause the processing-in-memory component to execute the processing-in-memory request, without performance of a cache directory lookup, responsive to the indication being clean.

In some aspects, the techniques described herein relate to a device, wherein in response to the indication being dirty, the processor core is further configured to cause a cache controller to flush the memory address from a cache system and transmit the processing-in-memory request to the processing-in-memory component after flushing the memory address from the cache system.

In some aspects, the techniques described herein relate to a device, wherein the indication is a bit that is assigned a first value in response to the memory address being clean and assigned a second value in response to the memory address being dirty.

In some aspects, the techniques described herein relate to a device, wherein the indication is a vector including multiple bits, wherein each of the multiple bits corresponds to one or more data elements included in the memory address and is assigned a first value in response to the corresponding one or more data elements being clean and assigned a second value in response to the corresponding one or more data elements being dirty.

In some aspects, the techniques described herein relate to a device, wherein causing processing-in-memory component to execute the processing-in-memory request responsive to the indication being clean is performed after receiving an indication that a prior processing-in-memory request has been executed by the processing-in-memory component.

In some aspects, the techniques described herein relate to a method including detecting that a computational task involves execution of a processing-in-memory request using one or more data elements associated with a memory address, identifying that the one or more data elements associated with the memory address are valid in memory accessible by a processing-in-memory component, and scheduling execution of the processing-in-memory request by the processing-in-memory component without triggering performance of a cache directory lookup or the memory address.

In some aspects, the techniques described herein relate to a method, further including detecting that the computational task involves execution of an additional processing-in-memory request using one or more data elements associated with the memory address, detecting that the one or more data elements associated with the memory address are stored in a cache system, and scheduling execution of the additional processing-in-memory request by triggering performance of a cache directory lookup or the memory address before transmitting the processing-in-memory request to the processing-in-memory component.

In some aspects, the techniques described herein relate to a method, wherein the one or more data elements associated with the memory address as stored in the cache system are different than the one or more data elements associated with the memory address as stored in the memory accessible by the processing-in-memory component.

FIG. 1 is a block diagram of a non-limiting example system 100 having a device that implements a processing unit and memory module to perform techniques for selectively bypassing cache directory lookups for processing-in-memory instructions. The device 102 includes a processing unit 104 and a memory module 106 communicatively coupled (e.g., via a bus structure, via a network-on-chip, and the like).

The techniques described herein are usable by a wide range of device 102 configurations. Examples of those devices include, by way of example and not limitation, computing devices, servers, mobile devices (e.g., wearables, mobile phones, tablets, laptops), processors (e.g., graphics processing units, central processing units, and accelerators), digital signal processors, machine learning inference accelerators, disk array controllers, hard disk drive host adapters, memory cards, solid-state drives, wireless communications hardware connections, Ethernet hardware connections, switches, bridges, network interface controllers, and other apparatus configurations. Additional examples include artificial intelligence training accelerators, cryptography and compression accelerators, network packet processors, and video coders and decoders.

As depicted in the illustrated example of FIG. 1, the processing unit 104 includes a core 108. The core 108 is an electronic circuit (e.g., implemented as an integrated circuit) that performs various operations on and/or using data in the memory module 106. Examples of processing unit 104 and core 108 configurations include, but are not limited to, a central processing unit (CPU), a graphics processing unit (GPU), a field programmable gate array (FPGA), an accelerated processing unit (APU), and a digital signal processor (DSP). For example, the core 108 is a processing unit that reads and executes instructions (e.g., of a program), examples of which include to add, to move data, and to branch. Although one core 108 is depicted in the illustrated example, in variations, the device 102 includes more than one core 108 (e.g., the device 102 is a multi-core processor). The memory module 106 is implemented as a printed circuit board, on which, memory 116 (e.g., physical memory) and a processing-in-memory component 118 are disposed (e.g., physically and communicatively coupled using one or more sockets).

The processing unit 104 includes a cache system 110 having a plurality of cache levels 112, examples of which are illustrated as a level 1 cache 114(1) through a level "N" cache 114(N). The cache system 110 is configured in hardware (e.g., as an integrated circuit) communicatively disposed between the processing unit 104 and the memory 116 of the memory module 106. The cache system 110 is configurable as integral with the core 108 as part of the processing unit 104, as a dedicated hardware device as part of the processing unit 104, and so forth. Configuration of the cache levels 112 as hardware is utilized to take advantage of a variety of locality factors. Spatial locality is used to improve operation in situations in which data is requested that is stored physically close to data that is a subject of a previous request. Temporal locality is used to address scenarios in which data that has already been requested will be requested again.

In cache operations, a "hit" occurs to a cache level when data that is subject of a load operation is available via the cache level, and a "miss" occurs when the desired data is not available via the cache level. When employing multiple cache levels, requests proceed through successive cache levels 112 until the data is located (e.g., from an L1 cache, to an L2 cache, to an L3 cache, and so forth). The cache system 110 is configurable in a variety of ways (e.g., in hardware) to address a variety of processor unit 104 configurations, such as a central processing unit cache, graphics processing unit cache, parallel processor unit cache, digital signal processor cache, and so forth.

In one or more implementations, the memory module 106 is a circuit board (e.g., a printed circuit board), on which memory 116 (e.g., physical memory such as dynamic random-access memory) is mounted and includes a processing-in-memory component 118 (e.g., implemented in hardware using one or more integrated circuits). In some variations, one or more integrated circuits of the memory 116 are mounted on the circuit board of the memory module 106, and the memory module 106 includes one or more processing-in-memory components 118. Examples of the memory module 106 include, but are not limited to, a TransFlash memory module, a single in-line memory module (SIMM), and a dual in-line memory module (DIMM). In one or more implementations, the memory module 106 is a single integrated circuit device that incorporates the memory 116 and the processing-in-memory component 118 on a single chip. In some examples, the memory module 106 is formed using multiple chips that implement the memory 116 and the processing-in-memory component 118 that are vertically ("3D") stacked together, are placed side-by-side on an interposer or substrate or are assembled via a combination of vertical stacking or side-by-side placement.

The memory 116 is a device or system that is used to store data, such as for immediate use in a device (e.g., by the core 108 and/or by the processing-in-memory component 118). In one or more implementations, the memory 116 corresponds to semiconductor memory where data is stored within memory cells on one or more integrated circuits. In at least one example, the memory 116 corresponds to or includes volatile memory, examples of which include random-access memory (RAM), dynamic random-access memory (DRAM), synchronous dynamic random-access memory (SDRAM), and static random-access memory (SRAM). Alternatively or in addition, the memory 116 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM).

The processing-in-memory component 118 is implemented in hardware (e.g., as an integrated circuit) configured to perform operations responsive to processing-in-memory instructions (e.g., received from the core 108). The processing-in-memory component 118 is representative of a processor with example processing capabilities ranging from relatively simple (e.g., an adding machine) to relatively complex (e.g., a CPU/GPU compute core). In an example, the processing-in-memory component 118 processes the instructions using data stored in the memory 116.

Processing-in-memory contrasts with standard computer architectures which obtain data from memory, communicate the data to a remote processing unit (e.g., the core 108), and process the data using the remote processing unit (e.g., using the core 108 rather than the processing-in-memory component 118). In various scenarios, the data produced by the remote processing unit as a result of processing the obtained data is written back to memory, which involves communicating the produced data from the remote processing unit to memory.

In terms of data communication pathways, the remote processing unit (e.g., the core 108) is further away from the memory 116 than the processing-in-memory component 118. As a result, these standard computer architectures suffer from increased data transfer latency, reduced data communication bandwidth, and increased data communication energy, particularly when the volume of data transferred between the memory and the remote processing unit is large, which can also decrease overall computer performance. Thus, the processing-in-memory component 118 enables increased computer performance while reducing data transfer energy as compared to standard computer architectures that implement remote processing hardware. Further, the processing-in-memory component 118 alleviates memory performance and energy bottlenecks by moving one or more memory-intensive computations closer to the memory 116.

Although the processing-in-memory component 118 is illustrated as being disposed within the memory module 106 (e.g., within a same integrated circuit or on a same printed circuit board), other examples are also contemplated. The processing-in-memory component 118, for instance, is also configurable to incorporate processing capability near memory modules so that tasks are also processed without costly round-trip transmission to host processors or other distant computing units. Access to the memory module 106 for the processing unit 104 is controlled through use of a memory controller 120.

The memory controller 120 is a digital circuit (e.g., implemented in hardware) that manages the flow of data to and from the memory 116 of the memory module 106. By way of example, the memory controller 120 includes logic to read and write to the memory 116. In one or more implementations, the memory controller 120 also includes logic to read and write to registers (e.g., temporary data storage) maintained by the processing-in-memory component 118, and to interface with the processing-in-memory component 118 (e.g., to provide instructions for processing by the processing-in-memory component 118).

The memory controller 120 also interfaces with the core 108. For instance, the memory controller 120 receives instructions from the core 108, via the cache coherence controller 122. The instructions involve accessing the memory 116 and/or the registers of the processing-in-memory component 118 and provide data to the core 108 (e.g., for processing by the core 108). In one or more implementations, the memory controller 120 is communicatively located between the core 108 and the memory module 106, and the memory controller 120 interfaces with the core 108, the memory module 106, and the cache coherence controller 122.

The core 108 is configured to initiate processing-in-memory (PIM) operations by the processing-in-memory component 118 using processing-in-memory requests that each include one or more processing-in-memory instructions. To ensure that the processing-in-memory component 118 operations on a valid version of data in the memory 116, a cache coherence controller 122 is employed. The cache coherence controller 122 is configurable in hardware (e.g., as one or more integrated circuits), support execution of instructions (e.g., by a microcontroller), and so forth. Validity of the data in the memory 116 refers to a scenario in which a version of data that is to be subject of a processing-in-memory operation is valid (e.g., is accurate in that the data has not been subsequently processed elsewhere) in the processing-in-memory component and the cache system 110. The cache coherence controller 122 is configured to query a cache directory 124 in what is referred to as a "cache directory lookup." The cache directory 124 describes which memory addresses of the memory 116 are maintained in the cache system 110 and a status of data at those memory addresses. A cache directory lookup, for instance, is used to determine whether the data at the memory address is "clean" and unchanged with respect to the data for that memory address maintained in the memory 116 or "dirty" and is changed. Therefore, a cache directory lookup as performed by the cache coherence controller 122 is usable to determine "what" data is stored in the cache system 110 and a status of that data.

Ensuring data validity is performable by the cache coherence controller 122 as a flush in a "dirty" scenario in which the data is caused to be "flushed" from the cache system 110 for storage in the memory 116, which then makes the data stored in the memory 116 valid for a processing-in-memory operation by the processing-in-memory component 118. In a "clean" scenario, the cache coherence controller 122 generates a cache request to cause the cache system 110 to invalidate the clean data in the cache system 110 such that subsequent accesses to the memory address are performed using the memory 116 and not the cache system 110, and as such is also valid for use as part of a processing-in-memory operation in that the accesses are performed to the memory 116 and not the cache system 110. In this manner, subsequent memory requests (e.g., as part of corresponding PIM operations) retrieve the data from memory 116 (e.g., that has been processed as part of the PIM operation) instead of using stale data from the cache system 110.

In conventional systems, processing-in-memory requests issued by the core 108 for execution by the processing-in-memory component 118 are routed to the cache directory 124, which then ensures validity of data elements (e.g., in memory 116) involved in executing the processing-in-memory request. However, such conventional systems inherently induce latency into a pipeline of executing processing-in-memory requests by stalling the processing-in-memory requests at the cache directory 124 while waiting for the cache coherence controller 122 to perform a cache directory lookup as part of ensuring validity of data elements involved in executing the processing-in-memory requests.

To avoid such delays and latency experienced by conventional system architectures, the core 108 is depicted as including a page table 126. The page table 126 is representative of a data structure used by the device 102 to store information describing mappings between a virtual address (e.g., as used by one or more application programs or other computational tasks executed by the processing unit 104) and a physical address for a memory address 128 in the memory 116. In implementations, the memory address 128 is representative of any suitable portion of the memory 116. For instance, in some implementations the memory address 128 represents a single memory page in memory 116. In system configurations where a single memory page in memory 116 includes 64 cache lines, the memory address 128 thus encompasses 64 cache lines of data elements. As another example, the memory address 128 is representative of a single cache line of data elements. As yet another example, the memory address 128 is representative of a single data element in memory 116. Thus, the memory address 128 is representative of any suitable portion (e.g., any suitable size) of the memory 116 and the page table 126 is configured to include entries for any number of memory addresses, as indicated by the ellipses surrounding memory address 128.

In accordance with the described techniques, the page table 126 includes a cache directory bypass bit 130 for each memory address 128. The cache directory bypass bit 130 is an indicator signaling whether one or more data elements included in the memory address 128 are "clean" or "dirty." In implementations where one or more data elements included in the memory address 128 are modified in the cache system 110 (e.g., such that a value of a data element as represented in the cache system 110 differs from a value of the data element as represented in memory 116), the cache directory bypass bit 130 is assigned a value (e.g., zero) indicating that the memory address 128 is dirty. Alternatively, in implementations where one or more data elements included in the memory address 128 are not modified in the cache system 110 (e.g., the one or more data elements are not included in the cache system 110), the cache directory bypass bit 130 is assigned a different value (e.g., one) indicating that the memory address is clean.

The value of the cache directory bypass bit 130 is used by the core 108, when generating a processing-in-memory request that includes one or more instructions involving data associated with the memory address 128, to selectively bypass a cache directory lookup for the processing-in-memory request. For instance, when the cache directory bypass bit 130 indicates that the memory address 128 is clean, a processing-in-memory request involving the memory address 128 is generated to bypass performance of a cache directory lookup. Alternatively, when the cache directory bypass bit 130 indicates that the memory address 128 is dirty, a processing-in-memory request involving the memory address 128 is generated to trigger performance of a cache directory lookup.

Although illustrated in FIG. 1 and described herein in the context of being a single bit indicating whether the memory address 128 is clean or dirty, in some implementations the cache directory bypass bit 130 is representative of a vector with multiple bits that each indicate whether a corresponding portion of the memory address 128 is clean or dirty. For instance, in a scenario where the memory address 128 includes data elements that span multiple cache lines in the cache system 110, a vector represented by the cache directory bypass bit 130 includes multiple bits-one bit for each of the multiple cache lines. In this manner, the cache directory bypass bit 130 is configurable with various levels of granularity to identify whether an entirety, or individual portions, of the memory address 128 are clean or dirty.

Further, although illustrated in FIG. 1 and described in the context of being maintained at the page table 126, information describing whether various portions of memory 116 are clean or dirty can be maintained at various system locations in accordance with the techniques described herein. For instance, in some implementations memory region tags are implemented using a hardware data structure (not depicted) that stores definitions (e.g., clean or dirty) for each memory address 128 or portion thereof. In some implementations maintaining information describing whether various portions of memory are clean or dirty apart from the page table 126 provides increased flexibility by allowing for arbitrary memory region sizes (e.g., relative to page table page-size constraints).

Thus, using the techniques described herein, the core 108 is informed as to the status of a memory address 128 prior to generating a processing-in-memory request that involves the memory address, via information represented by the cache directory bypass bit 130. As described in further detail below, when generating a processing-in-memory request involving a clean memory address 128, the core 108 generates the processing-in-memory request to bypass the cache coherence controller 122 performing a lookup using the cache directory 124 before the processing-in-memory request is scheduled for execution by the processing-in-memory component 118. In this manner, bypassing the cache directory 124 lookup avoids spending unnecessary computational cycles and resources on verifying that the memory address is clean-thus offering improved performance relative to conventional system that stall processing-in-memory requests during cache directory lookups.

Figure 2:
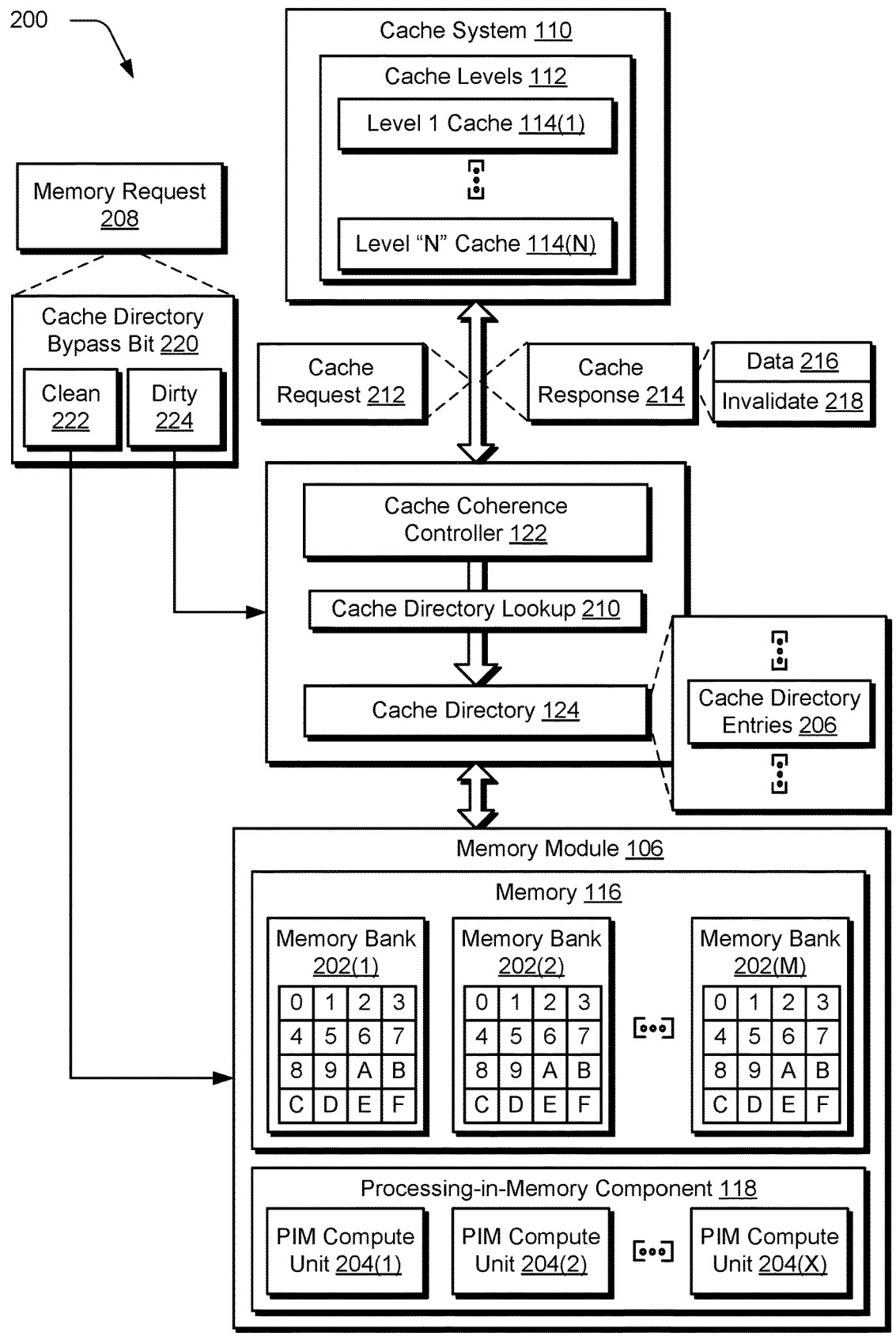
FIG. 2 is a block diagram of a non-limiting example system showing operation of performing a cache directory lookup for a processing-in-memory request or bypassing the cache directory lookup based on a cache directory bypass bit associated with the processing-in-memory request.

FIG. 2 is a block diagram of a non-limiting example system 200 showing operation of selectively bypassing cache directory lookups performed by the cache coherence controller 122 before a processing-in-memory request is scheduled for execution by the processing-in-memory component 118. In the illustrated example of FIG. 2, the memory 116 is implemented using a plurality of memory banks, examples of which are illustrated as memory bank 202(1), memory bank 202(2), . . . , memory bank 202(M), where M represents any integer (e.g., in one implementation, M=16). Likewise, the processing-in-memory component 118 is illustrated as including respective processing-in-memory (PIM) compute units, examples of which are illustrated as PIM compute unit 204(1), PIM compute unit 204(2), . . . , PIM compute unit 204(X), where X represents any integer.

The PIM compute units 204(1)-204(X) are configurable with a variety of processing capabilities in hardware (e.g., using one or more integrated circuits) ranging from relatively simple (e.g., an adding machine) to relatively complex (e.g., a CPU/GPU compute core). The processing unit 104 is configured to offload memory bound computations to the one or more in-memory processors of the processing-in-memory component 118. To do so, the core 108 generates PIM instructions and transmits the PIM instructions, via the memory controller 120, to the memory module 106. The processing-in-memory component 118 receives the PIM instructions and processes the instructions as PIM operations using the PIM compute units 204(1)-204(X) and data stored in the memory 116.

Processing-in-memory using PIM compute units 204(1)-204(X) contrasts with standard computer architectures which obtain data from memory 116, communicate the data to the core 108 of the processing unit 104, and process the data using the core 108 rather than the processing-in-memory component 118. In various scenarios, the data produced by the core 108 as a result of processing the obtained data is written back to the memory 116, which involves communicating the produced data over the pathway from the core 108 to the memory 116. In terms of data communication pathways, the core 108 is further away from the memory 116 than the processing-in-memory component 118. As a result, conventional (e.g., non-processing-in-memory enabled) computer architectures suffer from increased data transfer latency, reduced data communication bandwidth, and increased data communication energy, particularly when the volume of data transferred between the memory 116 and the processing unit 104 is large, which can also decrease overall device 102 performance.

In one or more implementations, the core 108 retrieves data from the memory 116 and stores the data in one or more caches levels 112 of a cache system 110 associated with the core 108. By way of example, the cache levels 112 of the core 108 include a level 1 cache 114(1), . . . , through a level "N" cache 114(N). In implementations in which the core 108 is a multi-core processor, for instance, the cache levels 112 include a level 3 cache is shared by each of the multiple cores 108. Thus, in these implementations, each core 108 of the multi-core processor stores data in a level 1 cache, a level 2 cache, and a shared level 3 cache. In terms of data communication pathways, the cache levels 112 are closer to the core 108 than the memory 116, and as such, data stored in the cache system 110 is accessible in less amount of time by the core 108 than an amount of time taken to access the data stored in the memory 116. It is to be appreciated that the one or more cores 108 of the processing unit 104 are configurable to include cache subsystems with differing numbers of caches and different hierarchical structures without departing from the spirit or scope of the described techniques.

In various examples, the core 108 retrieves a cache line in response to receiving an instruction to access a particular memory address. As used herein, a "cache line" is a unit of data transfer between the memory 116 and the cache system 110. In one example, the cache line is four bytes and the core 108 retrieves a contiguous four-byte block of data from the memory 116 that includes the data of the particular memory address. Further, the core 108 stores the four-byte block of data as a cache line in the cache system 110. If the core 108 receives a subsequent instruction to access a memory address that is a part of the cache line, the core 108 accesses the data of the memory address from the cache system 110, rather than the memory 116.

In one or more examples, the cache system 110 and the memory 116 store different versions of a corresponding cache line. For instance, the core 108 modifies a cache line that is stored in a cache level 112 of the cache system 110, and as such, the data corresponding to the cache line that is stored in the memory 116 is stale and therefore not valid for operations. Accordingly, the cache coherence controller 122 is employed to enforce cache coherence among the cache system 110 and the memory 116. Notably, cache coherence is the uniformity of data that is storable in multiple different memory resources in a system (e.g., the cache system 110 and the memory 116). As part of enforcing cache coherence, the cache coherence controller 122 employs a cache directory 124, which includes cache directory entries 206 for cache lines that are stored in one or more of the cache levels 112 of the cache system 110. In response to cache lines being added to the cache system 110, the cache coherence controller 122 creates cache directory entries 206 in the cache directory 124 that includes a range of memory addresses corresponding to the cache line.

In one example, the cache coherence controller 122 receives a memory request 208 to access data of a memory address from the memory 116. The memory request 208 is representative of a processing-in-memory request, a non-processing-in-memory request, or combinations thereof. In response to receiving the memory request 208, the cache coherence controller 122 performs a cache directory lookup 210 in the cache directory 124. The cache directory lookup 210 is used to determine whether one of the cache directory entries 206 represents a cache line that includes the memory address referenced by the memory request 208.

Based on a result of the cache directory lookup 210, the cache coherence controller 122 performs a corresponding coherence protocol. By way of example, a cache directory 124 miss occurs when the cache directory entries do not include the memory address (e.g., address range) specified by the memory request 208, and therefore the data as maintained for that memory address is valid in memory 116. In contrast, a cache directory 124 hit occurs when there is a cache directory entry 206 included in the cache directory 124 having an address range that includes the memory address of the memory request 208, and therefore the data as maintained for that memory address is not valid in memory 116.

If the cache directory lookup 210 indicates that data specified for a memory address in the memory request 208 is not valid for execution of a processing-in-memory instruction, the cache coherence controller 122 transmits a cache request 212 to the cache system 110. This causes the cache system 110 to transmit a cache response 214 such that the data in the memory 116 is subsequently valid for computation by the processing-in-memory component. This is performable, for instance, by leveraging the cache request to cause the cache system to write the data 216 back to memory (e.g., "flush" the data) and/or invalidate 218 the data in the cache system 110, which is acknowledged by the cache response 214. The cache coherence controller 122 then releases the memory request 208 to the processing-in-memory component 118 for processing (e.g., via a memory controller 120 for performance as part of a processing-in-memory operation).

Thus, the determination of whether a hit "has" or "has not" occurred serves as a basis to determine whether data in the memory specified by the memory request 208 is valid (e.g., for execution of a PIM operation by a respective processing-in-memory component 118). As previously described above, scenarios in which the data is not valid involve additional latency, either to cause the data to be flushed from the cache system 110 to the memory 116 or set to invalidate the data in the cache system 110. This challenge is increased when confronted with parallel execution scenarios.

As illustrated in FIG. 2, the memory 116 includes a plurality of memory banks 202(1)-202(M) that are organized into one or more memory arrays (e.g., grids), which include rows and columns such that data is stored in individual cells of the memory arrays. The memory banks 202(1)-202(M) are representative of a grouping of banks in relation to which the processing-in-memory component 118 is configured to perform various in-memory processing operations. By way of example, PIM compute units 204(1)-204(X) of the processing-in-memory component 118 are included as part of a memory channel along with respective ones of the memory banks 202(1)-202(M). The processing-in-memory component 118, through use of the PIM compute units 204(1)-204(X), performs in-memory processing operations on the data that is stored in the memory banks 202(1)-202(M). In the illustrated example, a plurality of memory channels includes a respective one of the PIM compute units 204(1)-204(X) and a respective one of the memory banks 202(1)-202(M), and a cache coherence controller 122 to enforce cache coherence among the memory banks 202(1)-202(M) within the memory channel and the cache levels 112 of the cache system 110.

The processing-in-memory component 118 is configurable to operate on each of the memory banks 202(1)-202(M) in parallel to execute a single PIM instruction. In the illustrated example, the processing-in-memory component 118 is configured to operate on sixteen memory banks 202(1)-202(M) and receives a PIM instruction to read data from a particular row and column address. To execute the instruction, the processing-in-memory component 118 reads the data of the particular row and column address from each of the memory banks 202(1)-202(M) in parallel.

Therefore, a single PIM instruction of a conventionally configured system triggers a plurality of cache directory lookups 210 in the cache directory 124 (e.g., one lookup for memory addresses in each one of the multiple memory banks 202(1)-202(M)). This is performed to ensure that the requested data stored in each of the memory banks 202(1)-202(M) is "valid" as being coherent with other instances of the requested data stored in the cache system 110.

Continuing with the previous example in which the processing-in-memory component 118 is configured to operate on sixteen memory banks 202(1)-202(M), a standard cache coherence controller 122 performs sixteen cache directory lookups 210 for a single PIM instruction. A cache directory lookup 210, however, is a computationally expensive task, particularly when a significant number (e.g., sixteen) of cache directory lookups are performed sequentially. Moreover, this significant number of cache directory lookups when performed even for a single PIM instruction often create a bottleneck in the cache directory 124 that affects both PIM workloads and non-PIM workloads. These problems are exacerbated by the notion that PIM instructions are often issued together as a series of sequential PIM instructions, rather than interspersed with non-PIM instructions. Due to this, the number of cache directory lookups to be performed multiplies with each sequential PIM instruction, thereby worsening the bottleneck and increasing cache directory lookup 210 latency and latency of operations that depend on these lookups (e.g., for processing by the processing-in-memory component 118).

To overcome these drawbacks of conventional techniques, the core 108 is configured to generate each memory request 208 to be executed by the processing-in-memory component 118 (e.g., each processing-in-memory request) with a cache directory bypass bit 220. The cache directory bypass bit 220 is representative of information specifying either a clean indication 222 or a dirty indication 224 for data elements stored in one or more memory addresses 128 that are involved in executing the processing-in-memory request. In implementations, a value of the cache directory bypass bit 220 assigned to a processing-in-memory request is determined based on the value of a cache directory bypass bit 130 for a memory address 128 that includes data elements involved in executing the processing-in-memory request.

For instance, in a scenario where a cache directory bypass bit 130 for a memory address 128 indicates that one or more data elements included in the memory address 128 are currently modified in the cache system 110, a processing-in-memory request involving the memory address 128 is assigned a cache directory bypass bit 220 with a dirty indication 224. The dirty indication 224 causes the processing-in-memory request (e.g., the memory request 208) to be routed to the cache coherence controller 122 to trigger performance of a cache directory lookup 210 and invalidation/flushing of the memory address 128 before the memory request 208 is forwarded to the processing-in-memory component 118 for execution.

In a different scenario where the cache directory bypass bit 130 for the memory address 128 indicates that no data elements included in the memory address 128 are current modified in the cache system 110 (e.g., all data elements of the memory address 128 are current in memory 116), a processing-in-memory request involving the memory address 128 is assigned a cache directory bypass bit 220 with a clean indication 222. The clean indication 222 causes the processing-in-memory request to be routed to the memory module 106 (e.g., for execution by the processing-in-memory component 118) without first being routed to the cache coherence controller 122 or otherwise triggering performance of a cache directory lookup 210 for the processing-in-memory request.

In some implementations, the cache directory bypass bit 220 assigned to a request reduces a number of cache directory lookups 210 performed for a processing-in-memory request by identifying specific data elements that are modified in the cache system 110 (e.g., relative to the memory 116) and thus triggering a cache directory lookup 210 for only those dirty data elements. For instance, in implementations the cache directory bypass bit 220 is representative of a vector that includes a bit for a subset (e.g., one or more) of data elements included in a memory address 128, where each bit is assigned either a clean indication 222 or a dirty indication 224. Upon receipt of such a processing-in-memory request, the cache coherence controller 122 is caused to perform a cache directory lookup 210 for only data elements having an associated dirty indication 224 while avoiding cache directory lookups 210 for data elements having an associated clean indication 222.

The system 200 is further configured to ensure that processing-in-memory requests having a cache directory bypass bit 220 with an associated clean indication 222 remain executed in order (e.g., are not scheduled for execution ahead of processing-in-memory requests stalled at the cache coherence controller 122 during a cache directory lookup 210 due to having a cache directory bypass bit 220 with a dirty indication 224). To do so, the system 200 refrains from dispatching a processing-in-memory request having a cache directory bypass bit 220 with a clean indication 222 to the memory module 106 until a cache response 214 is received for each previous processing-in-memory request routed to the cache coherence controller 122 for performance of a cache directory lookup 210. In this manner, the system 200 ensures that processing-in-memory requests are scheduled for execution in the proper order, even when cache directory lookups 210 are not bypassed for sequential processing-in-memory requests.

Figure 3:
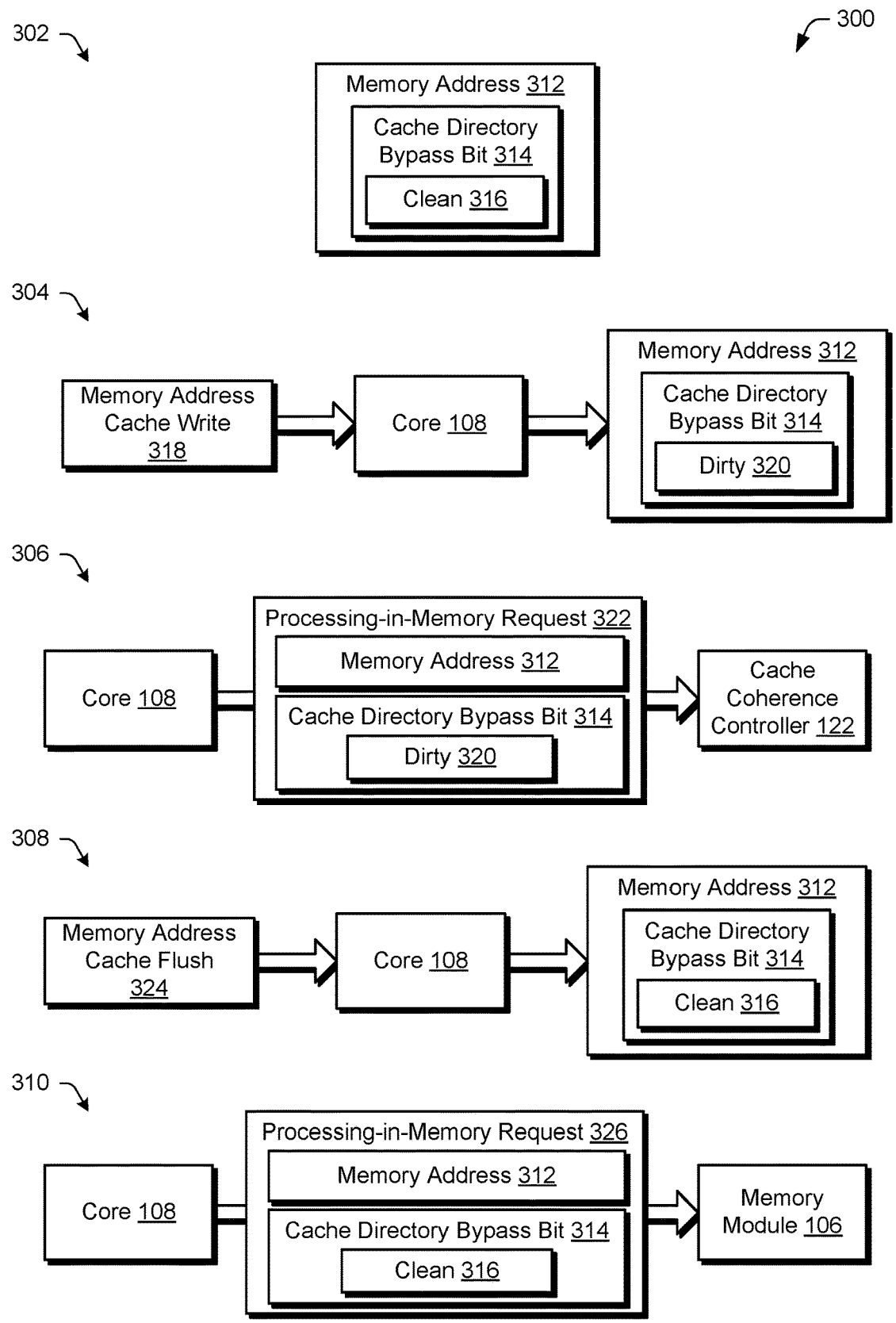
FIG. 3 is a block diagram of a non-limiting example system illustrated using first, second, third, fourth, and fifth stages as showing modification of a cache directory bypass bit associated with a memory address and assigning the cache directory bypass bit to a processing-in-memory request that involves data associated with the memory address.
Figure 4:
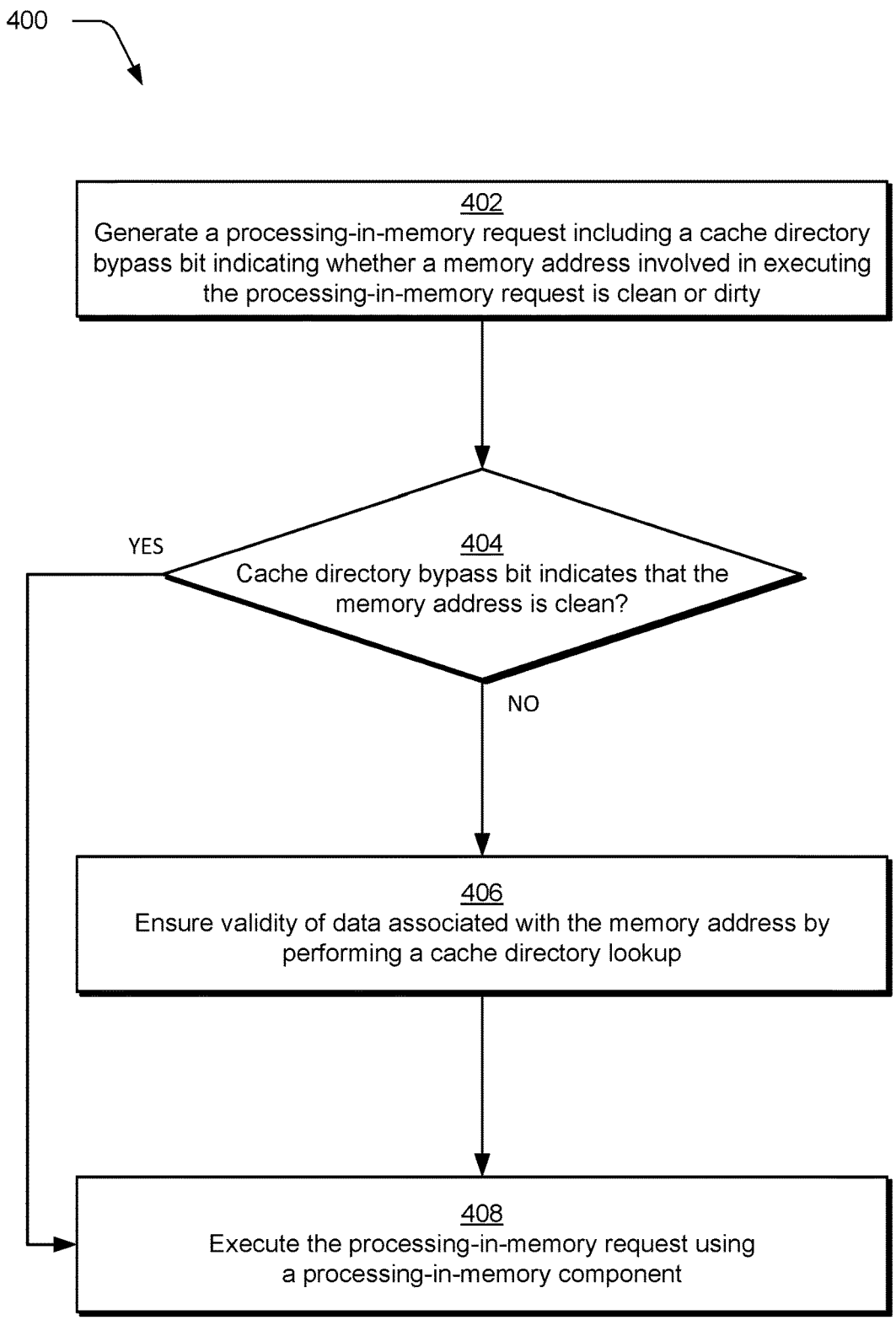
FIG. 4 is a block diagram of a non-limiting example procedure describing performance of conditionally bypassing a cache directory lookup for a processing-in-memory request.
Figure 5:
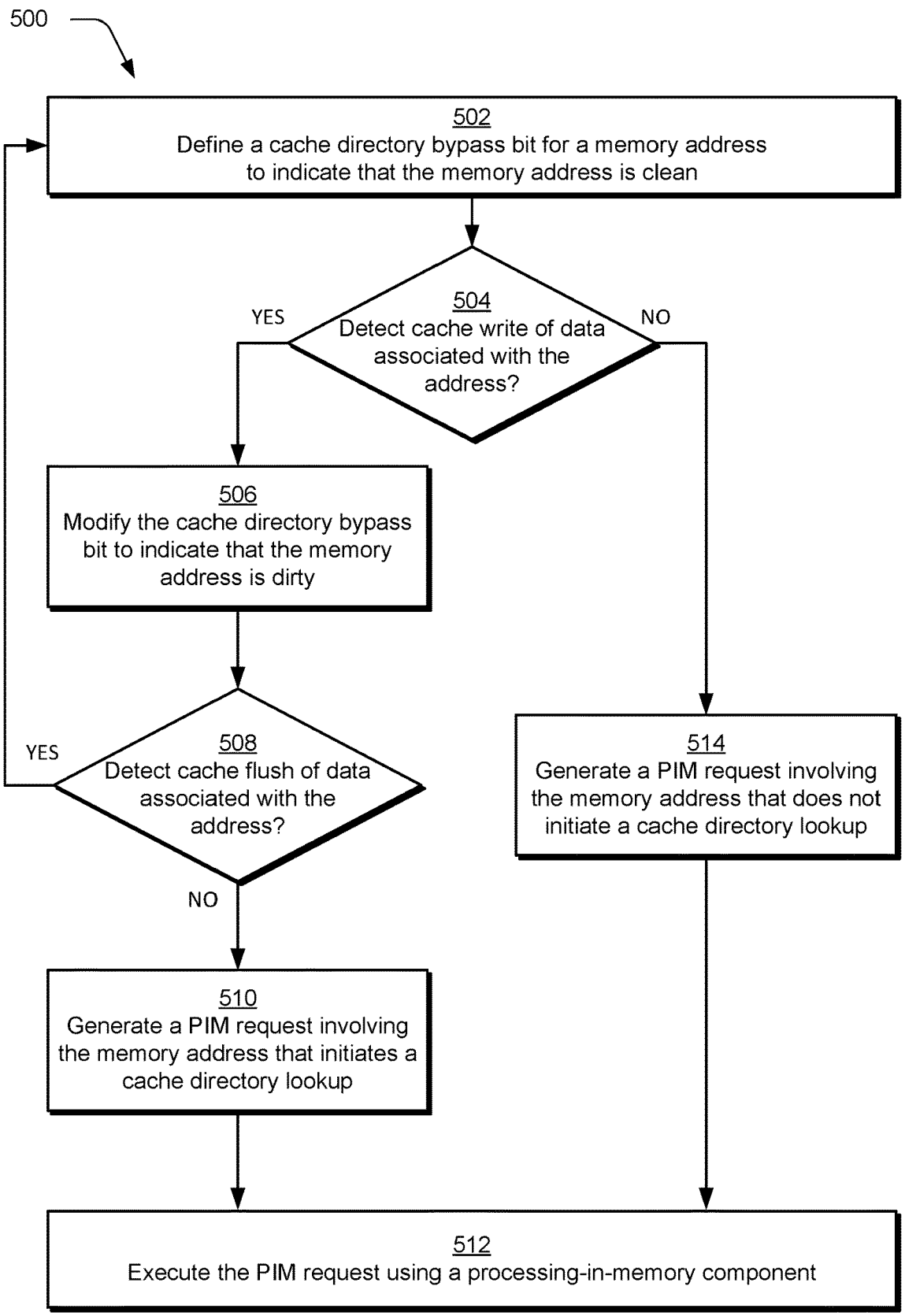
FIG. 5 is a block diagram of a non-limiting example procedure describing performance of updating a cache directory bypass bit that dictates bypassing a cache directory lookup for a processing-in-memory request.

In the following discussion, operation of the example system depicted in FIG. 3 is described in parallel to the procedures depicted in FIGS. 4 and 5. FIG. 4 is a block diagram of a non-limiting example procedure 400 describing performance of conditionally bypassing a cache directory lookup for a processing-in-memory request. FIG. 5 is a block diagram of a non-limiting example procedure 500 describing performance of updating a cache directory bypass bit that dictates bypassing a cache directory lookup for a processing-in-memory request.

FIG. 3 is a block diagram of a non-limiting example system 300 illustrated using a first stage 302, a second stage 304, a third stage 306, a fourth stage 308, and a fifth stage 310 as showing modification of a cache directory bypass bit associated with a memory address and assigning the cache directory bypass bit to a processing-in-memory request that involves data associated with the memory address.

At the first stage 302, a cache directory bypass bit for a memory address is defined to indicate that the memory address is clean (block 502). The memory address 312, for instance, is associated with a cache directory bypass bit 314 that is initialized with a clean indicator 316. In implementations, initialization of the memory address 312 is performed at initial memory allocation (e.g., when the cache system 110 is empty). Alternatively or additionally, initialization of the memory address 312 as having a cache directory bypass bit 314 with a clean indicator 316 is performed in response to detecting that the memory address 312 is assigned in response to memory allocation defining the memory address 312 as being read-only for a given program or computational task.

In implementations where the memory address 312 corresponds to shared memory that is accessible by different programs or computational tasks having different permissions (e.g., one program is permitted to modify the memory address 312 while another program is granted-read only permissions for the memory address 312), the core 108 is prevented form assigning a clean indicator 316 to the cache directory bypass bit 314 for the memory address 312. In such implementations, the core 108 maintains a list of shared memory regions and is constrained such that a clean indicator 316 cannot be assigned to a processing-in-memory request involving data maintained at a shared memory address. However, the following description presumes that the core 108 is permitted to assign a clean indicator 316 to a cache directory bypass bit 314 for the memory address 312.

At the second stage 304, the core 108 detects a memory address cache write 318 of one or more data elements included in the memory address 312 to the cache system 110. The core 108, for instance, receives an indication when data is written from the memory 116 to the cache system 110 and thus detects a cache write of data associated with the memory address 312 (block 504). In response to detecting the memory address cache write 318 (e.g., a "Yes" determination at block 504), the core 108 modifies the cache directory bypass bit 314 for the memory address 312 to include a dirty indicator 320 (block 506). After modifying the cache directory bypass bit 314 to indicate that the memory address 312 is dirty, the core 108 continues to monitor the cache system 110 to detect whether data associated with the memory address 312 is flushed from the cache system 110 to the memory 116 (block 508).

At the third stage 306, the core 108 is depicted as generating a processing-in-memory request 322 involving the memory address 312 that includes a cache directory bypass bit 314 indicating that memory address 312 is dirty (block 402) and thus initiates performance of a cache directory lookup (block 510). The core 108, for instance, identifies that the processing-in-memory request 322 involves processing data associated with the memory address 312 and assigns the cache directory bypass bit 314 with the dirty indicator 320 to the processing-in-memory request 322. As part of dispatching the processing-in-memory request 322, the core 108 determines whether the cache directory bypass bit 314 indicates that the memory address 312 is clean (block 404) and routes the processing-in-memory request 322 accordingly. For instance, the third stage 306 depicts a scenario where the cache directory bypass bit 314 indicates that the memory address 312 is dirty (e.g., a "No" determination at block 404) and the core 108 thus routes the processing-in-memory request 322 to the cache coherence controller 122.

By routing the processing-in-memory request 322 to the cache coherence controller 122, the core 108 ensures validity of data associated with the memory address 312 by causing the cache coherence controller 122 to perform a cache directory lookup 210 for the memory address 312 before the processing-in-memory request 322 is forwarded to the processing-in-memory component 118 for execution (block 406). After performance of the cache directory lookup 210 and flushing of data associated with memory address 312, the processing-in-memory request 322 is executed by a processing-in-memory component (block 408; block 512). The cache coherence controller 122, for instance, forwards the processing-in-memory request 322 to the memory controller 120 for scheduling execution at the processing-in-memory component 118 after ensuring that data elements associated with the memory address 312 are up to date (e.g., valid) in memory 116.

At the fourth stage 308, the core 108 detects a memory address cache flush 324 of data elements included in the memory address 312 from the cache system 110. The core 108, for instance, detects that data elements associated with the memory address 312 are flushed from the cache system 110 as a result of the cache coherence controller 122 performing a cache directory lookup 210 and flushing the memory address 312, as performed at the third stage 306. In response to detecting the memory address cache flush 324 of the memory address 312 from the cache system 110 (e.g., a "Yes" determination at block 508), the core 108 updates the cache directory bypass bit 314 for the memory address 312 to have a clean indicator 316, as represented in FIG. 5 by the arrow returning to block 502 from block 508.

At the fifth stage 310, the core 108 is depicted as generating a processing-in-memory request 326 involving the memory address 312 that includes a cache directory bypass bit 314 indicating that the memory address 312 is clean (block 402) and thus does not initiate performance of a cache directory lookup (block 514). The core 108, for instance, identifies that the processing-in-memory request 326 involves processing data associated with the memory address 312 and assigns the cache directory bypass bit 314 with the clean indicator 316 to the processing-in-memory request 326. As part of dispatching the processing-in-memory request 326, the core 108 determines whether the cache directory bypass bit 314 indicates that the memory address 312 is clean (block 404) and routes the processing-in-memory request 326 accordingly. For instance, the fifth stage 310 depicts a scenario where the cache directory bypass bit 314 indicates that the memory address 312 is clean (e.g., a "Yes" determination at block 404) and the core 108 thus routes the processing-in-memory request 326 to the processing-in-memory component 118 (e.g., via the memory controller 120 and bypassing the cache coherence controller 122).

By bypassing the cache coherence controller 122 when dispatching the processing-in-memory request 326, the core 108 avoids unnecessary consumption of computational resources that would otherwise be required when performing cache directory lookup(s) 210 for the processing-in-memory request 326. The processing-in-memory request 326 is thus executed by a processing-in-memory component (block 408; block 512) without performance of one or more cache directory lookups 210. The core 108, for instance, dispatches the processing-in-memory request 326 directly to the memory controller 120 for scheduling execution at the processing-in-memory component 118 without tasking the cache coherence controller 122 with ensuring that data elements associated with the memory address 312 are valid in memory 116.

In this manner, configuration of a cache directory bypass bit for each processing-in-memory request generated by the core 108 enables avoiding computational delays and energy consumption requirements of conventional systems that do not permit cache directory bypassing for processing-in-memory requests that involve clean memory addresses. Consequently, the cache directory lookup bypass techniques described herein ensure that data elements involved in processing-in-memory operations are "valid" without encountering the lag and delay involved with the "round trip" of conventional techniques that perform cache directory lookups and invalidations/flushes to ensure data validity. In this way, the techniques described herein improve operational efficiency, reduce latency, and reduce power consumption.

Many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102 having the core 108 and the memory module 106 having the memory 116 and the processing-in-memory component 118) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
 a processing-in-memory component;
 a cache system;
 a cache coherence controller; and
 a processor core configured to:
  generate a processing-in-memory request with an indication that a memory address associated with the processing-in-memory request is clean or dirty; and
  responsive to the indication being dirty, cause the cache coherence controller to perform a cache directory lookup for the memory address; or
  responsive to the indication being clean, cause the processing-in-memory component to execute the processing-in-memory request.

2. The system of claim 1, wherein the processor core is configured to maintain information describing whether one or more data elements included in the memory address are stored in the cache system.

3. The system of claim 2, wherein the processor core generates the processing-in-memory request with the indication that the memory address is dirty in response to the one or more data elements included in the memory address being stored in the cache system.

4. The system of claim 2, wherein the processor core generates the processing-in-memory request with the indication that the memory address is clean in response to the one or more data elements included in the memory address not being stored in the cache system.

5. The system of claim 2, wherein the processor core updates the information describing whether the one or more data elements included in the memory address are stored in the cache system in response to detecting a flush of the one or more data elements from the cache system.

6. The system of claim 2, wherein the processor core updates the information describing whether the one or more data elements included in the memory address are stored in the cache system in response to detecting a write of the one or more data elements to the cache system.

7. The system of claim 1, wherein in response to the indication being dirty, the processor core is further configured to cause the cache coherence controller to flush the memory address from the cache system and transmit the processing-in-memory request to the processing-in-memory component after flushing the memory address from the cache system.

8. The system of claim 1, wherein the indication is a bit that is assigned a first value in response to the memory address being clean and assigned a second value in response to the memory address being dirty.

9. The system of claim 1, wherein the indication is a vector comprising multiple bits, wherein each of the multiple bits corresponds to one or more data elements included in the memory address and is assigned a first value in response to the corresponding one or more data elements being clean and assigned a second value in response to the corresponding one or more data elements being dirty.

10. The system of claim 1, wherein the processor core is configured to ensure that a prior processing-in-memory request has been executed by the processing-in-memory component before causing the processing-in-memory component to execute the processing-in-memory request.

11. The system of claim 1, wherein responsive to the indication being clean, the processor core causes the processing-in-memory component to execute the processing-in-memory request without performance of the cache directory lookup.

12. A device comprising:
 a processor core configured to:
  generate a processing-in-memory request with an indication that a memory address associated with the processing-in-memory request is clean or dirty; and
  responsive to the indication being dirty, cause performance of a cache directory lookup for the memory address before the processing-in-memory request is executed; or
  responsive to the indication being clean, cause a processing-in-memory component to execute the processing-in-memory request.

13. The device of claim 12, wherein the processor core is configured to cause the processing-in-memory component to execute the processing-in-memory request, without performance of a cache directory lookup, responsive to the indication being clean.

14. The device of claim 12, wherein in response to the indication being dirty, the processor core is further configured to cause a cache controller to flush the memory address from a cache system and transmit the processing-in-memory request to the processing-in-memory component after flushing the memory address from the cache system.

15. The device of claim 12, wherein the indication is a bit that is assigned a first value in response to the memory address being clean and assigned a second value in response to the memory address being dirty.

16. The device of claim 12, wherein the indication is a vector comprising multiple bits, wherein each of the multiple bits corresponds to one or more data elements included in the memory address and is assigned a first value in response to the corresponding one or more data elements being clean and assigned a second value in response to the corresponding one or more data elements being dirty.

17. The device of claim 12, wherein causing processing-in-memory component to execute the processing-in-memory request responsive to the indication being clean is performed after receiving an indication that a prior processing-in-memory request has been executed by the processing-in-memory component.

18. A method comprising:
   detecting that a computational task involves execution of a processing-in-memory request using one or more data elements associated with a memory address;
   identifying that the one or more data elements associated with the memory address are valid in memory accessible by a processing-in-memory component; and
   scheduling execution of the processing-in-memory request by the processing-in-memory component without triggering performance of a cache directory lookup or the memory address.

19. The method of claim 18, further comprising:
   detecting that the computational task involves execution of an additional processing-in-memory request using one or more data elements associated with the memory address;
   detecting that the one or more data elements associated with the memory address are stored in a cache system; and
   scheduling execution of the additional processing-in-memory request by triggering performance of a cache directory lookup or the memory address before transmitting the processing-in-memory request to the processing-in-memory component.

20. The method of claim 19, wherein the one or more data elements associated with the memory address as stored in the cache system are different than the one or more data elements associated with the memory address as stored in the memory accessible by the processing-in-memory component.

* * * * *